United States Patent [19]

Massingill, Jr. et al.

[11] Patent Number: 4,820,784
[45] Date of Patent: Apr. 11, 1989

[54] MODIFIED ADVANCED EPOXY RESINS

[75] Inventors: John L. Massingill, Jr.; Raul A. Pabon, Jr., both of Lake Jackson, Tex.

[73] Assignee: The Dow Chemical Company, Midland, Mich.

[21] Appl. No.: 143,558

[22] Filed: Jan. 13, 1988

[51] Int. Cl.$^4$ ................. C08G 59/14; C08G 59/02
[52] U.S. Cl. ................... 525/481; 525/488; 525/510; 525/523; 528/103; 528/104; 528/108
[58] Field of Search ............ 528/103, 104, 108; 525/523, 481, 488, 510

[56] References Cited

U.S. PATENT DOCUMENTS

| | | | |
|---|---|---|---|
| 3,937,679 | 2/1976 | Bosso et al. | 260/29.3 |
| 4,164,487 | 8/1979 | Martin | 260/29.2 EP |
| 4,256,844 | 3/1981 | Martin et al. | 528/108 X |
| 4,289,812 | 9/1981 | Martin | 427/379 |
| 4,316,922 | 2/1982 | Perine et al. | 428/35 |
| 4,360,613 | 11/1982 | Shimp | 528/108 X |
| 4,397,970 | 8/1983 | Campbell et al. | 523/402 |
| 4,452,929 | 6/1984 | Powers et al. | 528/108 X |
| 4,481,347 | 11/1984 | Bertram et al. | 528/104 X |
| 4,507,461 | 3/1985 | Bowditch | 528/104 |
| 4,608,313 | 8/1986 | Hickner et al. | 428/414 |
| 4,613,661 | 9/1986 | Langer et al. | 525/523 X |
| 4,692,382 | 9/1987 | Schmitt et al. | 525/523 X |

FOREIGN PATENT DOCUMENTS 2137205A 10/1984 United Kingdom .

*Primary Examiner*—Earl Nielsen

[57] ABSTRACT

Modified advanced epoxy resins are prepared by reacting (A) an advanced epoxy resin prepared by reacting (1) an epoxy resin having at least one aromatic ring, an average of more than one, but not more than about 2 vicinal epoxy groups per molecule and which contains at least one oxyalkylene or substituted oxyalkylene group per molecule; with (2) a dihydric phenol; with (B) a phosphorus-containing compound.

41 Claims, No Drawings

MODIFIED ADVANCED EPOXY RESINS

FIELD OF THE INVENTION

The present invention concerns advanced epoxy resins prepared from dihydric phenols and compounds having an average of more than one glycidyl ether group per molecule, at least one aromatic group per molecule and at least two alkoxy groups per molecule which advanced epoxy resins have been reacted with phosphoric acid or a phosphate ester.

BACKGROUND OF THE INVENTION

Advanced aromatic epoxy resins are well known for their extremely useful combination of properties such as flexibility, adhesion, resistance to corrosion, chemical and solvent resistance and the like. Unfortunately, they also have some well known disadvantages such as sensitivity to ultraviolet light, relatively high viscosities, limited formability and the like. Advanced aliphatic epoxy resins are well known for their low viscosities and flexibility; however, they lack physical strength and are sensitive to water and chemicals. It would be desirable to have available advanced epoxy resins which have unique combinations of viscosity (low), and when cured with a suitable curing agent, good flexibility, strength and resistance to water and chemicals and solvents.

SUMMARY OF THE INVENTION

One aspect of the present invention pertains to a modified advanced epoxy resin which results from reacting (A) an advanced epoxy resin which results from reacting (1) an epoxy resin composition comprising
 (a) at least one epoxy resin having at least one aromatic ring, an average of more than one, but not more than two vicinal epoxy groups per molecule and which contains at least one oxyalkylene or substituted oxyalkylene group per molecule; and
 (b) optionally at least one epoxy resin which has an average of more than one but not more than about two vicinal epoxy groups per molecule and which is different from the epoxy resin of (a) above;

wherein components (a) and (2) are present in amounts such that from about 5 to about 100 equivalent percent of the epoxide groups are derived from component (a) and from about zero to about 95 equivalent percent of the epoxide groups are derived from component (b); with (2) at least one compound having two aromatic hydroxyl groups per molecule;

wherein components (1) and (2) are employed in amounts which provide a ratio of aromatic hydroxyl groups per epoxy group of from about 0.005:1 to about 200:1; with (B) a phosphorus-containing compound selected from (1) phosphoric acid;
(2) super phosphoric acid;
(3) phosphate esters; or
(4) any combination of components (B-1), (B-2) or (B-3);

wherein components (A) or (B) are present in an amount such that the ratio of moles of component (B) to epoxy groups contained in component (A) is from about 0.1:1 to about 5:1.

Another aspect of the present invention pertains to a curable composition which comprises (I) the aforesaid reaction product of the advanced epoxy resin and phosphorus-containing compound and (II) a curing amount of a suitable curing agent for component (I).

The compositions of the present invention have unique combinations of viscosity (low), and when cured with a suitable curing agent, good flexibility, strength and resistance to water and chemicals and solvents.

DETAILED DESCRIPTION OF THE INVENTION

The advanced epoxy resins employed in the present invention are prepared by reacting the epoxy resin or mixture of epoxy resins with the compound having two aromatic hydroxyl groups per molecule or mixture of such compounds at a temperature suitably from about 25° C., most suitably from about 50° C. to about 225° C. for a time sufficient to complete the reaction, suitably from about 1 to about 8, more suitably from about 1 to about 6, most suitably from about 1 to about 4, hours. The higher the temperature, the shorter the reaction time and the lower the temperature the longer the reaction time. The reaction is usually conducted in the presence of a catalyst and if desired, one or more solvents. The reactants are employed in amounts such that the ratio of phenolic hydroxyl groups to epoxide group is suitably from about 0.005:1 to about 200:1, more suitably from about 0.5:1 to about 5:1, most suitably from about 0.5:1 to about 1:1.

The epoxy resin which is advanced with the compound having two aromatic hydroxyl groups has suitably from about 5 to about 100, more suitably from about 10 to about 100, most suitably from about 25 to about 100, percent of the epoxy groups derived from an epoxy resin which contains oxyalkylene or substituted oxyalkylene groups and suitably from about zero to about 95, more suitably from about zero to about 90, most suitably from about zero to about 75, percent of the epoxy groups derived from an epoxy resin which is different from the aforementioned epoxy resin.

Suitable epoxy resins having at least one aromatic ring, an average of more than one, but not more than about two glycidyl ether groups per molecule and which contain at least one oxyalkylene or substituted oxyalkylene group per molecule include, those represented by the following formula I

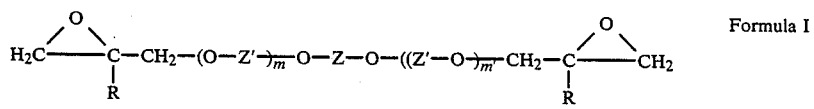

Formula I wherein each R is independently hydrogen or an alkyl group having from 1 to about 4 carbon atoms, preferably hydrogen or methyl, most preferably hydrogen; Z is a divalent aromatic group represented by the following formulas II and III

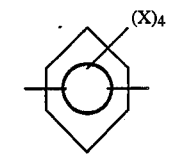

Formula II

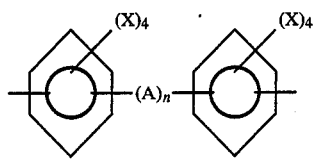

Formula III wherein A is a divalent hydrocarbyl group having suitably from 1 to about 12, more suitably from 1 to about 6, most suitably from 1 to about 3, carbon atoms, —S—, —S—S—, —SO—, —SO$_2$—, —CO—, or —O—; each X is independently hydrogen, a hydrocarbyl or hydrocarbyloxy group having suitably from 1 to about 12, more suitably from 1 to about 6, most suitably from 1 to about 3, carbon atoms, or a halogen, more suitably chlorine or bromine, most suitably bromine; n is zero or 1; each Z' is independently a group represented by the following formula IV

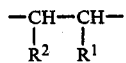

Formula IV wherein each $R^1$ and $R^2$ are independently hydrogen or a hydrocarbyl or hydrocarbyloxy group having suitably from 1 to about 12, more suitably from 1 to about 6, most suitably from 1 to about 3, carbon atoms or an —CH$_2$—O—R$^3$ group wherein R$^3$ is a hydrocarbyl group having suitably from about 1 to about 12, more suitably from about 1 to about 9, most suitably from about 1 to about 6, carbon atoms; and each m an m' independently has a value suitably from 1 to about 25, more suitably from 1 to about 10, most suitably from 1 to about 5.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the object to which it is attached.

Particularly suitable epoxy resins which have an average of more than one but not more than about two vicinal epoxy groups and at least one aromatic ring per molecule and at least one oxyalkylene group or substituted oxyalkylene group per molecule include, for example, the glycidyl ethers of the reaction products of (1) an aromatic compound having two aromatic hydroxyl groups per molecule or mixture of such compounds and (2) an alkylene or substituted alkylene oxide or monoglycidyl ether or any combination thereof.

Suitable compounds having two aromatic hydroxyl groups per molecule which can be employed herein include, for example those represented by the following formulas V and VI

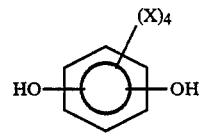

Formula V

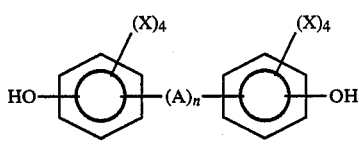

Formula VI wherein A, X and n are as defined above.

Particularly suitable aromatic compounds having two aromatic hydroxyl groups per molecule include, for example, catechol, hydroquinone, resorcinol, biphenol, bisphenol A, bisphenol F, bisphenol K, bisphenol S, combinations thereof and the like. Particularly suitable alkylene oxides include, for example, ethylene oxide, 1,2-propylene oxide, 1,2-butylene oxide, 2,3-butylene oxide, combinations thereof and the like. Particularly suitable substituted alkylene oxides include, for example styrene oxide, t-butyl styrene oxide, isopropenyl benzene oxide, combinations thereof and the like. Suitable monoglycidyl ethers include, for example, glycidyl ethers of ethylenically unsaturated monocarboxylic acids, alkyl glycidyl ethers aryl glycidyl ethers, combinations thereof and the like. Particularly suitable monoglycidyl ethers include, for example, phenyl glycidyl ether, butyl glycidyl ether, glycidyl acrylate, glycidyl methacrylate, dodecyl glycidyl ether, combinations thereof and the like.

Suitable epoxy resins which have an average of more than one but not more than about two vicinal epoxy groups per molecule and which are different from the aforementioned epoxy resins include, for example, those aromatic epoxy resins represented by the following formulas VII and VIII as well as those aliphatic epoxy resins represented by the following formula IX

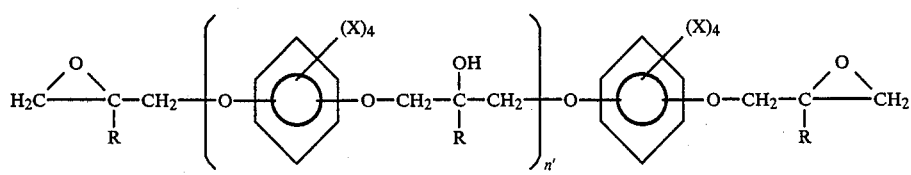

Formula VII

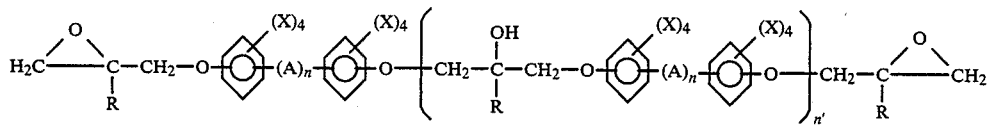

Formula VIII

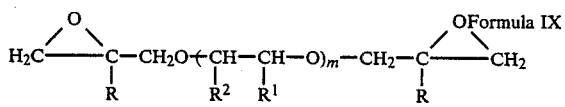

Formula IX wherein A, R, $R^1$, $R^2$, X, m and n are as defined above and n' suitably has an average value from about zero to about 5, more suitably from about 0.01 to about 0.5, most suitably from about 0.03 to about 0.15.

Particularly suitable as the other epoxy resins are those epoxy resins which have an average of more than one but not more than about two vicinal epoxy groups and at least one aromatic ring per molecule which are free of oxyalkylene or substituted oxyalkylene groups.

The term free of oxyalkylene or substituted oxyalkylene groups means that the epoxy resin is free of groups represented by the following formulas X and XI

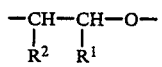

Formula X

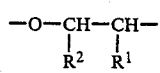

Formula XI wherein $R^1$ and $R^2$ are as defined above.

More particularly suitable epoxy resins which have an average of more than one but not more than about two vicinal epoxy groups and at least one aromatic ring per molecule and which are free of oxyalkylene groups include, for example, the glycidyl ethers of catechol, resorcinol, hydroquinone, biphenol, bisphenol A, bisphenol F, bisphenol K, bisphenol S, any combination thereof and the like.

The epoxy resins which are prepared from compounds having aliphatic hydroxyl groups which are reacted with an epihalohydrin can be prepared by any of the known methods for preparing alpiphatic epoxy resins such as conducting the reaction in the presence of a Lewis acid such as, for example, stannic chloride, boron trifluoride, combinations thereof and the like; followed by dehydrohalogenation with a basic acting compound such as an alkali metal hydroxide. Most preferably, these epoxy resins are prepared by the method disclosed in GB No. 2,137,205A which is incorporated herein by reference.

Suitable catalysts which can be employed to prepare the advanced epoxy resins include, for example, tertiary amines, phosphines, ammonium compounds, phosphonium compounds, metal hydroxides and the like. Particularly suitably catalysts include, ethyl triphenyl phosphonium chloride, ethyl triphenyl phosphonium bromide, ethyl triphenyl phosphonium iodide, ethyl triphenyl phosphonium acetate acetic acid complex, tetrabutyl phosphonium chloride, tetrabutyl phosphonium bromide tetrabutyl phosphonium iodide, tetrabutyl phosphonium acetate acetic acid complex, combinations thereof and the like. The catalyst is suitably employed in a catalytic amount which in most instances is an amount which corresponds to from about 0.0001 to about 0.02, more suitably form about 0.002 to about 0.02, most suitably from about 0.002 to about 0.01, moles of catalyst permole of epoxy resin.

Suitable solvents which can be employed in the preparation of the advanced epoxy resins include, for example, alcohols, ketones, glycol ethers, aliphatic hydrocarbons, halogenated aliphatic hydrocarbons, aromatic hydrocarbons, combinations thereof and the like. Particularly suitable solvents include, for example, toluene, xylene, propylene glycol methyl ether, propylene glycol butyl ether, propylene glycol monotertiarybutyl ether, ethylene glycol monobutyl ether (2-butoxyethanol), combinations thereof and the like. The solvent can be employed suitably in amounts of from about zero to about 50, more suitably from about 3 to about 30, most suitably from about 3 to about 20 percent by weight based upon the combined weight of the epoxy resin and the phenolic compound.

Suitable phosphorus-containing compounds which can be employed herein to react with the advanced epoxy resins include, for example, phosphoric acid, super phosphoric acid, phosphate esters, combinations thereof and the like. Suitable phosphate esters include those represented by the following formula XII.

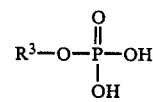

Formula XII wherein $R^3$ is hydrogen or a hydrocarbyl group having suitably from 1 to about 20, more suitably from about 1 to about 8, most suitably from about 1 to about 4 carbon atoms.

Particularly suitable phosphorus-containing compounds which can be employed to modify the advanced epoxy resins to prepare the modified advanced epoxy resins of the present invention include, for example, phosphoric acid, super phosphoric acid, phosphorus pentoxide, butyl phosphate ester, butyl ether of ethylene glycol phosphate ester, combinations thereof and the like.

The phosphorus-containing compound is employed in an amount which provides a ratio of moles of the phosphorus-containing compound, component (B), to epoxy groups contained in the advanced epoxy resins, component (A), is suitably from about 0.1:1 to about 5:1, more suitably from about 0.1:1 to about 1.5:1, most suitably from about 0.1:1 to about 1:1.

The modified advanced epoxy resins of the present invention can be cured with any suitable curing agent for epoxy resins including, for example, primary and secondary polyamines, carboxylic acids and anhydrides thereof, phenolic hydroxyl-containing compounds, guanidines, biguanides, urea-aldehyde resins, melamine-aldehyde resins, alkoxylated ureaaldehyde resins, alkoxylated melamine-aldehyde resins, phenol-aldehyde (resole) resins, combinations thereof and the like. Particularly suitable curing agents include, for example, diethylenetriamine, Nadic methyl anhydride, phenol-formaldehyde (resole) resins, cresolformaldehyde (resole) resins, bisphenol A-formaldehyde (resole) resins, melamine-formaldehyde resins, methoxylated melamine-formaldehyde resins, ureaformaldehyde resins, methoxylated urea-formaldehyde resis, combinations thereof and the like. The curing agents are employed in an amount which will effectively cure the composition containing the epoxy resin. These amounts will depend upon the particular epoxy resin and curing agent employed; however, suitable amounts include, for example, from about 0.025 to about 4, more suitably from about 0.5 to about 2, most suitably from about 0.75 to about 1.25 equivalents of curing agent per epoxide equivalent for those curing agents which cure by reacting with the epoxy group of the epoxy resin or per hydroxyl group for those curing agents which cure by reacting with the aliphatic hydroxyl groups along the backbone of the epoxy resin.

The advanced epoxy resins of the present invention can be blended with other materials such as solvents or diluents, fillers, pigments, dyes, flow modifiers, thickeners, reinforcing agents, accelerators, combinations thereof and the like.

These additives are added in functionally equivalent amounts eg, the pigments and/or dyes are added in quantities which will provide the composition with the desired color; however, they are suitably employed in amounts of from about 1 to about 200, more suitably from about 10 to about 100, most suitably from about 50 to about 100 percent by weight based upon the weight of the resin binder.

Solvents or diluents which can be employed herein include, for example, hydrocarbons, ketones, glycol ethers, esters, chlorinated hydrocarbons,, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, ethylene glycol butyl ether, propylene glycol methyl ether, 1,1,1-trichloroethane. DuPont DBE dibasic ester, ethylacetate, propylene glycol t-butyl ether, combinations thereof and the like.

Reinforcing materials which can be employed herein include natural and synthetic fibers in the form of woven, mat, monofilament, multifilament, and the like. Suitable reinforcing materials include, glass, ceramics, nylon, rayon, cotton, aramid, graphite,combinations thereof and the like.

Suitable fillers which can be employed herein include, for example, inorganic oxides, ceramic microspheres, plastic microspheres, combinations thereof and the like.

The fillers can be employed in amounts suitably from about 1 to about 200, more suitably from about 10 to about 100 most suitably from about 50 to about 100 percent by weight based upon the weight of the resin binder.

The advanced epoxy resin compositions of the present invention can be employed in the preparation of coatings, castings, laminates, composites, encapsulants, potting compositions, and the like.

EXAMPLE 1

(A) Preparation of glycidyl ether of reaction product of bisphenol A and Propylene oxide Into a reaction vessel equipped with stirrer, temperature controller, condenser, and nitrogen pad containing 500 g of ethylene dichloride is dissolved, at 75° C., 172 g (1 OH equiv.) of the reaction product of propylene oxide and bisphenol A in a molar ratio of 2 to 1, respectively, and which is available from The Dow Chemical Company as Dow Resin 565. Stannic chloride, 5 g (0.02 equiv.) is added and the temperature is raised to reflux, 88° C. Epichlorohydrin, 194 g (1.2 equiv.) is added over a 45 minute period from a dropping funnel. The solution turns black. The reaction mixture is cooled to 70° C. and 6 ml (0.0166 moles) of a 60% aqueous solution of benzyl trimethylammonium chloride and 500 g (2.5 moles) of a 20% aqueous solution of sodium hydroxide are added and the reaction mixture cooled to 50° C. for 2 hours. The reaction mixture is cooled to 35° C. and the aqueous layer is separated from the organic layer. To the organic layer is added an additional 250 g (1.25 moles) of 20% aqueous sodium hydroxide and 3 ml (0.008 moles) of a 60% aqueous solution of benzyl trimethylammonium chloride catalyst is added. The reaction mixture is heated to 50° C. and maintained thereat with stirring for 2 hours. The reaction mixture is cooled to 35° C. and the aqueous layer is separated from the organic layer. The organic layer is washed three times with 150 ml portions of water. The ethylene dichloride is removed under vacuum in a rotary evaporator at 150° C. The resultant product has an epoxide equivalent weight (EEW) of 301.75, an aliphatic hydroxyl content of 1.86 wt. percent and a viscosity of 4040 cps (4.04 Pa·s) at 25° C.

(B) Preparation of Advanced Epoxy Resin

A diglycidyl ether of bisphenol A having an EEW of 180, 152.7 g (0.85 epoxy equiv.), is blended with 356.2 g (1.18 epoxy equiv.) of the product from A above. This mixture is heated to 80° C. at which time 191.2 g (1.68 equiv.) of bisphenol A is added. After the bisphenol A has dissolved, 0.727 g of a 70 wt. percent methanolic solution of ethyl triphenyl phosphonium acetate acetic acid complex catalyst is added. The reaction mixture is heated to 150° C. and the heat source is turned off. The reaction exotherm causes the temperature to rise to 190° C., which temperature is maintained for 4 hours. The resultant advanced epoxy resin has an EEW of 1839.

(C) Modification of Advanced Epoxy Resin

To 95 g (0.052 equiv.) of the advanced epoxy resin prepared in (B) above is mixed with 10.3 g of ethylene glycol monobutyl ether in a three neck 500 ml round bottom flask equipped with a mechanical stirrer, a temperature controller, condenser and a nitrogen pad. The mixture is heated to 125° C. with stirring to dissolve the resin. A mixture of 0.95 g (1% by weight based on advanced epoxy resin solids) super phosphoric acid and 4.75 g ethylene glycol monobutyl ether is added to the resin solution all at once. The reaction mixture exotherms to 130° C. The reaction mixture is stirred and the temperature maintained at 125° C. for 30 minutes. Deionized water, 2 g, is then added to hydrolyze the di- and tri-esters thus formed. The reaction mixture is then stirred and heated at 125° C. for an additional 2 hours. Additional ethylene glycol monobutyl ether solvent, 16 g, is added to give a solid solution of the modified advanced epoxy resin phosphate ester containing 78% by weight nonvolatiles.

(D) Preparation of Base Formulation

A base formulation is prepared by blending 57 g of the resin solution from C above.

8.9 g of Methylon 75108 resole curing agent available from BTL Chemical Specialties.

1.12 g of dimethylethanolamine as a dispersing agent.

3.1 g of CYMEL ™ 247-10 available from American Cyanamid Company as a flow additive/curing agent.

1.0 g of DBE dibasic ester available from DuPont as a solvent.

(E) Preparation of Coating

The Base Formulation from D above is blended with 4 g of DuPont dibasic ester, DBE, solvent and 90 g of water is added over a period of 10 minutes. An aqueous dispersion with a bluish tinge is obtained. The particle size of the dispersion is 0.1 micron and the volatile organic component (VOC) is 2.6 lbs/gal. (3.14 kg/m$^3$). This coating contains 50% by weight nonvolatiles. This dispersion is coated onto tin free steel can stock wtih a drawdown bar to give a 0.2 mil dry film thickness coating. The coated panel is baked at 400° F. for 10 minutes in an electric oven. The properties of the resultant coating are given in the Table.

(F) Preparation of Coating

The Base Formulation from D above except that it did not contain any melamine (CYMEL) is blended with 4 g of DuPont dibasic ester, DBE, solvent, 30 g of ethylene glycol monobutyl ether and 5 grams of butanol. The formulation contains 50% by weight nonvolatiles and a Gardner viscosity of X+ (1400 cps, 1.2 Pa·s). This solution is then diluted with 15 g of DBE solvent to give a 45% by weight nonvolatiles solution with an application viscosity of Gardner R (480 cps, 0.48 Pa·s. This solvent borne coating is coated onto tin free steel can stock with a drawdown bar to give a 0.2 mil dry film thickness coating. The coating is baked for 10 minutes at 400° F. The properties of the resultant coating are given in the Table.

SOLVENT RESISTANCE is measured by rubbing the coating with a 2-pound (0.9 Kg) ballpein hammer where the hammer head is covered with gauze and soaked in methyl ethyl ketone (MEK). The number of double rubs, push-pull motion, observed until a marring of the coating occurs is recorded.

FLEXIBILITY is measured by the wedgebend test according to ASTM D3281-84 or T-bend test according to ASTM D4145-83.

AUTOCLAVE STEAM PROCESS RESISTANCE is measured by subjecting a stressed panel (about 2"×4", 50.8 mm×101.6 mm) to 14.5 psig (100 kPa) steam for 90 minutes. The panels are then removed from the autoclave or pressure cooker and dried with paper towels. The coatings are observed for any signs of blush as evidenced by a white tinge to the coating.

ADHESION is then tested by cutting an X in the stressed area. Cellophane tape, SCOTCH ™ 610, is then rubbed into each of the X's and removed with a smooth rapid pull. Any coating loss is noted.

The properties are given in the Table.

COMPARATIVE EXPERIMENT A

For comparative purposes, a coating is prepared using the unmodified resin from 1B employing the solvent borne procedure of Example 1F. Note the improvement in autoclave blush resistance for the two modified resins of Examples 1E and 1F compared to unmodified Comparative Experiment A.

| Ex. or Comp. Expt. Desig. | MEK Double Rubs | Wedge Bend Loss, mm | T Bend | Autoclave Blush[a] | Ahesion |
|---|---|---|---|---|---|
| 1E | 100+ | 51 | T2 | none | pass[b] |
| 1F | 50 | 13 | T2 | none | pass |
| A* | 30 | 24 | T2 | slight | pass |

*Not an example of the invention.
[a]Amount of white appearance on the coating surface.
[b]No coating is removed when the tape is pulled off.

What is claimed is:

1. A modified advanced epoxy resin which results from reacting
   (A) an advanced epoxy resin which results from reacting
      (1) an epoxy resin composition comprising
         (a) at least one epoxy resin having an average of more than one, but not more than two vicinal epoxy groups per molecule and which contains at least one oxyalkylene or substituted oxyalkylene group per molecule; and
         (b) optionally at least one epoxy resin which has an average of more than one but not more than about two vicinal epoxy groups per molecule and which is different from the epoxy resin of (1) above;
      wherein components (a) and (b) are present in amounts such that from about zero to about 100 equivalent percent of the epoxide groups are derived from component (a) and from about 5 to about 95 equivalent percent of the epoxide groups are derived from component (2); with
      (2) at least one compound having two aromatic hydroxyl groups per molecule;
      wherein components (1) and (2) are employed in amounts which provide a ratio of aromatic hydroxyl groups per epoxy group of from about 0.005:1 to about 200:1; with
   (B) a phosphorus-containing compound selected from
      (1) phosphoric acid;
      (2) super phosphoric acid;
      (3) phosphate esters; or
      (4) any combination of components (B-1), (B-2) or (B-3);
   wherein components (A) and (B) are present in an amount such that the ratio of moles of component (B) to epoxy groups contained in component (A) is from about 0.1:1 to about 5:1.

2. A modified advanced epoxy resin of claim 1 wherein
   (a) in component (A-1), from about 10 to about 100 equivalent percent of the epoxy groups are derived from component (a) and from about zero to about 90 equivalent percent of the epoxy groups are derived from component (b);
   (b) components (A-1) and (A-2) are employed in an amount which provide a ratio of aromatic hydroxyl groups per epoxy group of from about 0.5:1 to about 5:1; and
   (c) components (A) and (B) are present in an amount such that the ratio of moles of component (B) to epoxy groups contained in component (A) is from about 0.1:1 to about 1.5:1.

3. An advanced epoxy resin of claim 2 wherein
   (a) in component (A-1), from about 25 to about 100 equivalent percent of the epoxy groups are derived from component (a) and from about zero to about 75 equivalent percent of the epoxy groups are derived from component (b);
(b) components (A-1) and (A-2) are employed in an amount which provide a ratio of aromatic hydroxyl groups per epoxy group of from about 0.5:1 to about 1:1; and
(c) components (A) and (B) are present in an amount such that the ratio of moles of component (B) to epoxy groups contained in component (A) is from about 0.1:1 to about 1:1.

4. An advanced epoxy resin of claim 1 wherein
(a) component (A-1-a) is an epoxy resin or mixture of epoxy resins represented by the following formula

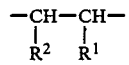

Formula IV wherein each $R^1$ and $R^2$ are idependently hydrogen or a hydrocarbyl or hydrocarbyloxy group having 1 to about 12 carbon atoms or a $-CH_2-O-R^3$ group wherein $R^3$ is a hydrocarbyl group having from about 1 to about 12 carbon atoms; and each m an m' independently has a value from 1 to about 25;
(b) component (A-1-b) is an epoxy resin or mixture of epoxy resins represented by the following formulas VII, VIII or IX or combinations thereof;

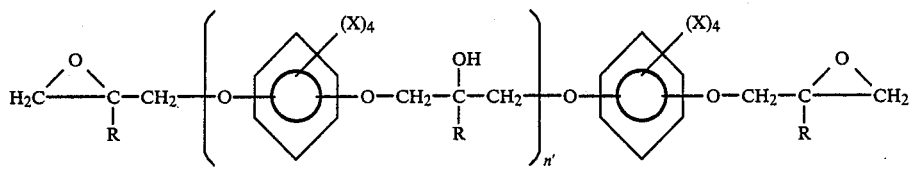

Formula VII

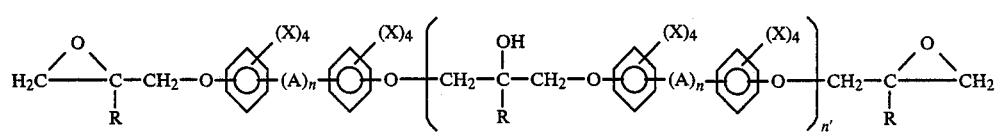

Formula VIII

I

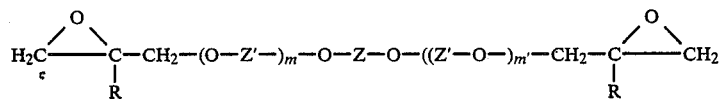

Formula I wherein each R is independently hydrogen or an alkyl group having from 1 to about 4 carbon atoms; Z is a divalent aromatic group represented by the following formulas II and III

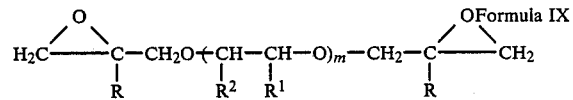

Formula IX wherein A, R, $R^1$, $R^2$, X, m and n are as defined above and n' has an average value from zero to about 5;
(c) component (A-2) is a compound or a mixture of compounds represented by the following formulas V and VI

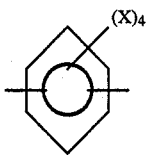

Formula II

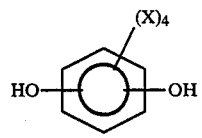

Formula V

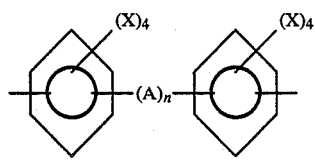

Formula III

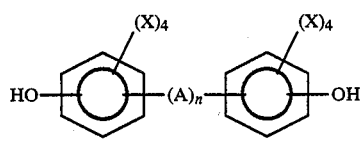

Formula VI wherein A is a divalent hydrocarbyl group having from 1 to about 12 carbon atoms, $-S-$, $-S-S-$, $-SO-$, $-SO_2-$, $-CO-$, or $-O-$; each X is independently hydrogen, a hydrocarbyl or hydrocarbyloxy group having from 1 to about 12 carbon atoms, or a halogen; n is zero or 1; each Z' is independently a group represented by the following formula IV wherein A, X and n are as defined above; and (d) component (B) is a volatile monoamine.

5. An advanced epoxy resin of claim 4 wherein (a) in formulas I, II, III and IV, each A is independently a divalent hydrocarbon group having from 1 to about 6 carbon atoms; each R is hydrogen or a methyl group; when $R^1$ or $R^2$ are hydrocarbyl groups, they have from 1 to about 6 carbon atoms; $R^3$ has from 1 to about 9 carbon atoms; when X is a hydrocarbyl group, it has from 1 to about 6 carbon atoms; and m and m' have an average value from 1 to about 10;

(b) in formulas VII and VIII, each A is independently a divalent hydrocarbon group having from 1 to about 6 carbon atoms; each R is hydrogen or a methyl group; when X is a hydrocarbyl group, it has from 1 to about 6 carbon atoms; and n' has an average value of from about 0.01 to about 0.5;

(c) in formulas V and VI, when X is a hydrocarbyl group, it has from 1 to about 6 carbon atoms; and (d) component (A-1-b) is an epoxy resin represented by formulas VII or VIII or a combination thereof.

6. An advanced epoxy resin of claim 4 wherein (a) in formulas I, II, III and IV, each A is independently a divalent hydrocarbon group having from 1 to about 6 carbon atoms; each R is hydrogen; when $R^1$ or $R^2$ are hydrocarbyl groups, they have from 1 to about 3 carbon atoms; $R^3$ has from a about 1 to about 6 carbon atoms; when X is a hydrocarbyl group, it has from 1 to about 3 carbon atoms; and m and m' have an average value from 1 to about 5;

(b) in formulas VII and VIII, each A is independently a divalent hydrocarbon group having from 1 to about 3 carbon atoms; each R is hydrogen; when X is a hydrocarbyl group, it has from 1 to about 3 carbon atoms; and n' has an average value of from about 0.03 to about 0.15;

(c) in formulas V and VI, when X is a hydrocarbyl group, it has from 1 to about 3 carbon atoms; and (d) component (A-1-b) is an epoxy resin represented by formulas VII or VIII or a combination thereof.

7. An advanced epoxy resin of claim 4 wherein (a) component (A-1-a) is an epoxy resin represented by formula I wherein each R is hydrogen; Z is represented by formula III wherein each A is a divalent hydrocarbon group having from 1 to about 3 carbon atoms; each X is independently hydrogen, a hydrocarbyl group having from 1 to about 3 carbon atoms or bromine; n has a value of 1; and m an m' have an average value of from 1 to about 5;

(b) component (A-1-b) is an epoxy resin represented by formula VIII wherein A is a divalent hydrocarbyl group having from 1 to about 3 carbon atoms; each R is hydrogen; each X is independently hydrogen, a hydrocarbyl group having from 1 to about 3 carbon atoms or bromine; n has a value of 1 and n' has an average value of from about 0.03 to about 0.15; and (c) component (A-2) is a compound represented by formula VI wherein A is a divalent hydrocarbyl group having from 1 to about 3 carbon atoms; each R is hydrogen; each X is independently hydrogen, a hydrocarbyl group having from 1 to about 3 carbon atoms or bromine; and n has a value of 1.

8. An advanced epoxy resin of claim 4 wherein (a) component (A-1-a) is a diglycidyl ether of the reaction product of bisphenol A with ethylene oxide, propylene oxide, butylene oxide, phenyl glycidyl ether, butyl glycidyl ether or a combination thereof;

(b) component (A-1-b) is a diglycidyl ether of bisphenol A, bisphenol F or a combination thereof; and (c) component (B) is a bisphenol A, bisphenol F or a combination thereof.

9. A modified advanced epoxy resin of claim 1, 2, 3, 4, 5, 6, 7 or 8 which has additionally been reacted with a monoamine.

10. A modified advanced epoxy resin of claim 9 wherein said monoamine is methyl ethanolamine.

11. A curable composition which comprises and advanced epoxy resin of claim 1, 2, 3, 4, 5, 6, 7 or 8 and a curing quantity of a suitable curing agent for said advanced epoxy resin.

12. A curable composition of claim 11 wherein said curing agent is an amido amine, a primary or secondary amine, an anhydride, a phenol, a urea-aldehyde resin, a melamine-aldehyde resin, an alkoxylated urea-aldehyde resin, an alkoxylated melamine-aldehyde resin, a phenol-aldehyde (resole) resin, a cresole-aldehyde (resole) resin, or any combination thereof.

13. A curable composition of claim 12 wherein said curing agent is diethylenetetramine, Nadic methyl anhydride, phenol-formaldehyde (resole) resin, cresol-formaldehyde (resole) resin, bisphenol A-formaldehyde (resole) resin, melamine-formaldehyde resin, urea-formaldehyde resins, methoxylated melamine-formaldehyde resin, methoxylated urea-formaldehyde resin, or any combination thereof.

14. A curable composition which comprises and advanced epoxy resin of claim 9 and a curing quantity of a suitable curing agent for said advanced epoxy resin.

15. A curable composition of claim 14 wherein said curing agent is an amido amine, a primary or secondary amine, an anhydride, a phenol, a urea-aldehyde resin, a melamine-aldehyde resin, an alkoxylated urea-aldehyde resin, an alkoxylated melamine-aldehyde resin, a phenol-aldehyde (resole) resin, a cresole-aldehyde (resole) resin, or any combination thereof.

16. A curable composition of claim 15 wherein said curing agent is diethylenetetramine, Nadic methyl anhydride, phenol-formaldehyde (resole) resin, cresol-formaldehyde (resole) resin, bisphenol A-formaldehyde (resole) resin, melamine-formaldehyde resin, urea-formaldehyde resins, methoxylated melamine-formaldehyde resin, methyoxylated urea-formaldehyde resin, or any combination thereof.

17. A curable composition which comprises and advanced epoxy resin of claim 10 and a curing quantity of a suitable curing agent for said advanced epoxy resin.

18. A curable composition of claim 17 wherein said curing agent is an amido amine, a primary or secondary amine, an anhydride, a phenol, a urea-aldehyde resin, a melamine-aldehyde resin, an alkoxylated urea-aldehyde resin, an alkoxylated melamine-aldehyde resin, a phenol-aldehyde (resole) resin, a cresol-aldehyde (resole) resin, or any combination thereof.

19. A curable composition of claim 18 wherein said curing agent is diethylenetetramine, Nadic methyl anhydride, phenol-formaldehyde (resole) resin, cresol-formaldehyde (resole) resin, bisphenol A-formaldehyde (resole) resin, melamine-formaldehyde resin, urea-formaldehyde resins, methoxylated melamineformaldehyde resin, methoxylated urea-formaldehyde resin, or any combination thereof.

20. The product resulting from curing the curable composition of claim 9.

21. The cured product of claim 20 which contains a reinforcing agent.

22. The product resulting from curing the curable composition of claim 10.

23. The cured product of claim 22 which contains a reinforcing agent.

24. The product resulting from curing the curable composition of claim 11.

25. The cured product of claim 24 which contains a reinforcing agent.

26. The product resulting from curing the curable composition of claim 12.

27. The cured product of claim 26 which contains a reinforcing agent.

28. The product resulting from curing the curable composition of claim 13.

29. The cured product of claim 28 which contains a reinforcing agent.

30. The product resulting from curing the curable composition of claim 14.

31. The cured product of claim 30 which contains a reinforcing agent.

32. The product resulting from curing the curable composition of claim 15.

33. The cured product of claim 32 which contains a reinforcing agent.

34. The product resulting from curing the curable composition of claim 16.

35. The cured product of claim 34 which contains a reinforcing agent.

36. The product resulting from curing the curable composition of claim 17.

37. The cured product of claim 36 which contains a reinforcing agent.

38. The product resulting from curing the curable composition of claim 18.

39. The cured product of claim 38 which contains a reinforcing agent.

40. The product resulting from curing the curable composition of claim 19.

41. The cured product of claim 40 which contains a reinforcing agent.

* * * * *